United States Patent [19]
Klug et al.

[11] Patent Number: 5,528,526
[45] Date of Patent: Jun. 18, 1996

[54] ARBITRARY REPEATING PATTERN DETECTOR

[75] Inventors: Keith M. Klug, Mesa; Steven R. Tugenberg, Scottsdale, both of Ariz.

[73] Assignee: Motorola, Inc., Schaumburg, Ill.

[21] Appl. No.: 308,473

[22] Filed: Sep. 19, 1994

Related U.S. Application Data

[63] Continuation of Ser. No. 12,204, Feb. 2, 1993, abandoned.

[51] Int. Cl.$^6$ ....................................................... G06F 7/02
[52] U.S. Cl. ................... 364/715.11; 340/146.2; 382/218
[58] Field of Search ................. 364/717, 717.5, 364/715.11; 382/218; 340/146.2

[56] References Cited

U.S. PATENT DOCUMENTS

| | | | |
|---|---|---|---|
| 3,855,576 | 12/1974 | Braun et al. | 382/34 |
| 4,736,424 | 4/1988 | Busby | 380/50 |
| 4,977,596 | 12/1990 | Maestas et al. | 370/100.1 |
| 5,014,327 | 5/1991 | Potter et al. | 382/33 |
| 5,020,058 | 5/1991 | Holden et al. | 370/109 |
| 5,208,832 | 5/1993 | Greiss | 364/715.11 |

FOREIGN PATENT DOCUMENTS

61-173527   8/1986   Japan.

Primary Examiner—David H. Malzahn
Attorney, Agent, or Firm—Harold C. McGurk, IV

[57] ABSTRACT

An arbitrary repeating pattern detector (ARPD) detects short cycle patterns having a length of N or less, where N is an integer number. The ARPD obtains data symbols from a random number generator. ARPD may be implemented in a circuit or process which evaluates data symbols $b_1$–$b_{2N}$. A mismatch detector compares symbols $b_{I+J-1}$ with symbols $b_{N+J}$ for all combinations of I and J, where I and J are integer numbers in the range of 1–N, inclusive. For each value of I, an alternative detector determines whether at least one mismatch occurs at any value of J. If such a mismatch is detected, an alternative indication declares a mismatch at the corresponding value of I. A conjunction detector determines whether alternative indications for all values of I indicate mismatches. If a single match is found, a repeating pattern is declared.

21 Claims, 5 Drawing Sheets

ARBITRARY REPEATING PATTERN DETECTOR

This application is a continuation of prior application Ser. No. 08/012,204, filed Feb. 2, 1993, now abandoned.

TECHNICAL FIELD OF THE INVENTION

The present invention relates generally to pattern recognition devices. More specifically, the present invention relates to electronic and computer devices which detect arbitrary data patterns that repeat within a sequence of data symbols.

BACKGROUND OF THE INVENTION

Many electronic systems and computerized processes use random data for various reasons. Cryptography requires random data for generating encryption and decryption keys. In the field of communications, spread spectrum communication systems rely on random data. In the audio and video fields, random data are used to generate white noise.

Unfortunately, the generation of random data is a troublesome task. Truly random data is difficult to generate from automated processes. Accordingly, linear feedback shift register (LFSR) circuits, computerized processes, and other techniques have been devised to form pseudorandom number generators. When operating properly, pseudorandom number generators produce data symbols that are sufficiently random for many purposes. When practically realizable pseudorandom number generators fail to produce sufficiently random data for a particular application, random number generators may be constructed which are responsive to various randomly occurring physical phenomenon, such as transistor characteristics.

Designers that incorporate random and pseudorandom number generators in their designs conventionally achieve only a low degree of confidence that the symbols being generated by a random or pseudorandom number generator are in fact sufficiently random. Those skilled in the art will appreciate that testing for sufficient randomness is a difficult task because there can be no specific "correct" or "incorrect" set of symbols if the symbols are more or less random.

Traditionally, randomness has been determined by performing extensive statistical testing, such as chi-squared tests, delta tests, and the like, on a sequence of generated symbols. Such tests cannot be performed in real time because they require a great amount of computational processing power. Accordingly, they work adequately to verify a random or pseudorandom number generator's design but are entirely inadequate for real time use, such as determining whether a component failure has occurred in a valid design or whether an external influence is causing insufficiently random symbols to be generated from an otherwise valid random or pseudorandom number generator design.

Those skilled in the art can easily devise circuits and processes that detect stuck-at-zero and stuck-at-one failure modes for random and pseudorandom number generators. However, the stuck-at-zero and stuck-at-one failure modes represent only a fraction of the likely failures which may cause generated symbols to become insufficiently random. A vast number of likely failure modes, particularly in pseudorandom number generators, cause short cycle patterns in a sequence of symbols. Short cycle patterns are arbitrary patterns having a relatively few symbols that sequentially repeat throughout a sequence of many symbols. Stuck-at-one and stuck-at-zero failure modes are short cycle patterns, but a vast number of other potential short cycle patterns are missed by simple tests for stuck-at-one and stuck-at-zero conditions.

SUMMARY OF THE INVENTION

Accordingly, it is an advantage of the present invention that an improved repeating pattern detector is provided.

Another advantage of the present invention is that short cycle patterns are detected.

Yet another advantage is that the present invention provides a reliable integrity test on sequences of random and pseudorandom numbers.

Still another advantage is that the present invention detects short cycle patterns in real time.

Still another advantage is that the present invention may be implemented in hardware, in software, or in a combination of hardware and software as desired for a particular application.

Still another advantage is that the present invention may be realized in a simple, reliable, and inexpensive implementation.

The above and other advantages of the present invention are carried out in one form by an arbitrary repeating pattern detector. The pattern detector includes a device for supplying a sequence of symbols. A mismatch detector is responsive to these symbols. The mismatch detector determines whether predetermined ones of the symbols match other predetermined ones of the symbols. As a result of the mismatch detector's determinations, the mismatch detector provides sets of comparison indications. An alternative detector is responsive to these comparison indications. The alternative detector determines whether, for each of the sets of comparison indications, any one of the comparison indications within the set indicates a mismatch. As a result of the alternative detector's determinations, the alternative detector provides alternative indications. A conjunction detector couples to the alternative detector and determines whether all of the alternative indications indicate mismatches. A repeating pattern is indicated when any one of the alternative indications fails to indicate a mismatch.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
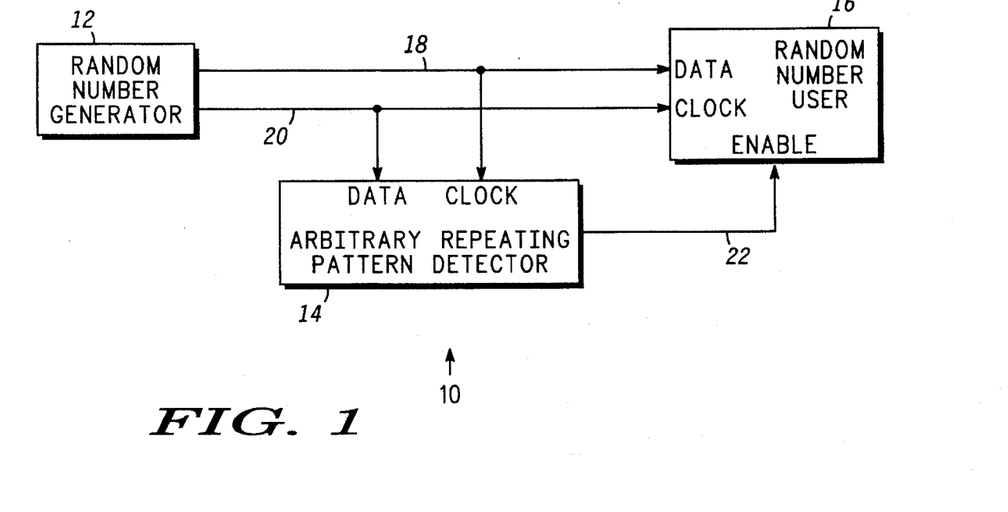
FIG. 1 shows a block diagram of a system which incorporates an arbitrary repeating pattern detector.

FIG. 1 shows a block diagram of a system 10 which incorporates a random number generator 12, an arbitrary repeating pattern detector (ARPD) 14, and a random number user 16. Random number generator 12 generates random or pseudorandom numbers in any conventional or unconventional manner. The random or pseudorandom numbers may be supplied as a sequence or stream of data symbols on a bus 18 and may be accompanied by a clock signal supplied on a bus 20. The clock signal indicates when the symbols are valid. While the preferred embodiment of the present invention operates upon individual bits of digital data, those skilled in the art will appreciate that the random numbers may be configured as data symbols having one or more bits or as other digits or characters that convey data. ARPD 14 and random number user 16 both couple to random number generator 12 to receive the stream of symbols and accompanying clock. ARPD 14 has an output 22 which couples to an enable input of random number user 16.

ARPD 14 detects short cycle patterns in the symbols supplied on bus 18. Short cycle patterns are symbol patterns that sequentially repeat within a sequence of symbols supplied on bus 18. The precise number of symbols to be detected in a repeating pattern is not a critical factor in the present invention. ARPD 14 may be easily adapted to detect any short cycle pattern of length N or less, where N is an integer number smaller than or equal to one-half the total number of symbols M included in the sequence of random symbols supplied over bus 18. ARPD 14 does not look for any particular symbol patterns. Rather, if any arbitrary symbol pattern of length N or less sequentially repeats, ARPD 14 will detect the repetition. Sequential repetition is back to back repetition of the pattern without intervening data that are not a part of the repeating pattern.

ARPD 14 performs an integrity test on the random symbols supplied over bus 18. Those skilled in the art will appreciate that by detecting short cycle patterns, many diverse failure modes associated with random number generator 12 may be identified. ARPD 14 activates its output 22 to indicate the detection of a repeating pattern which constitutes a short cycle pattern.

Random number user 16 represents any circuit, system, process, application, or the like which uses the random symbols supplied by random number generator 12. For example, random number user 16 may represent a cryptography system, an audio or video noise generator, a computer program, a spread spectrum radio, or other devices and processes. Random number user 16 may desirably treat the signal provided from ARPD 14 over output 22 as an enable signal. Thus, random number user 16 may operate normally whenever this output signal is not active and take standby, emergency, shutdown, alarm, notification, or other actions when this signal activates.

Figure 2:
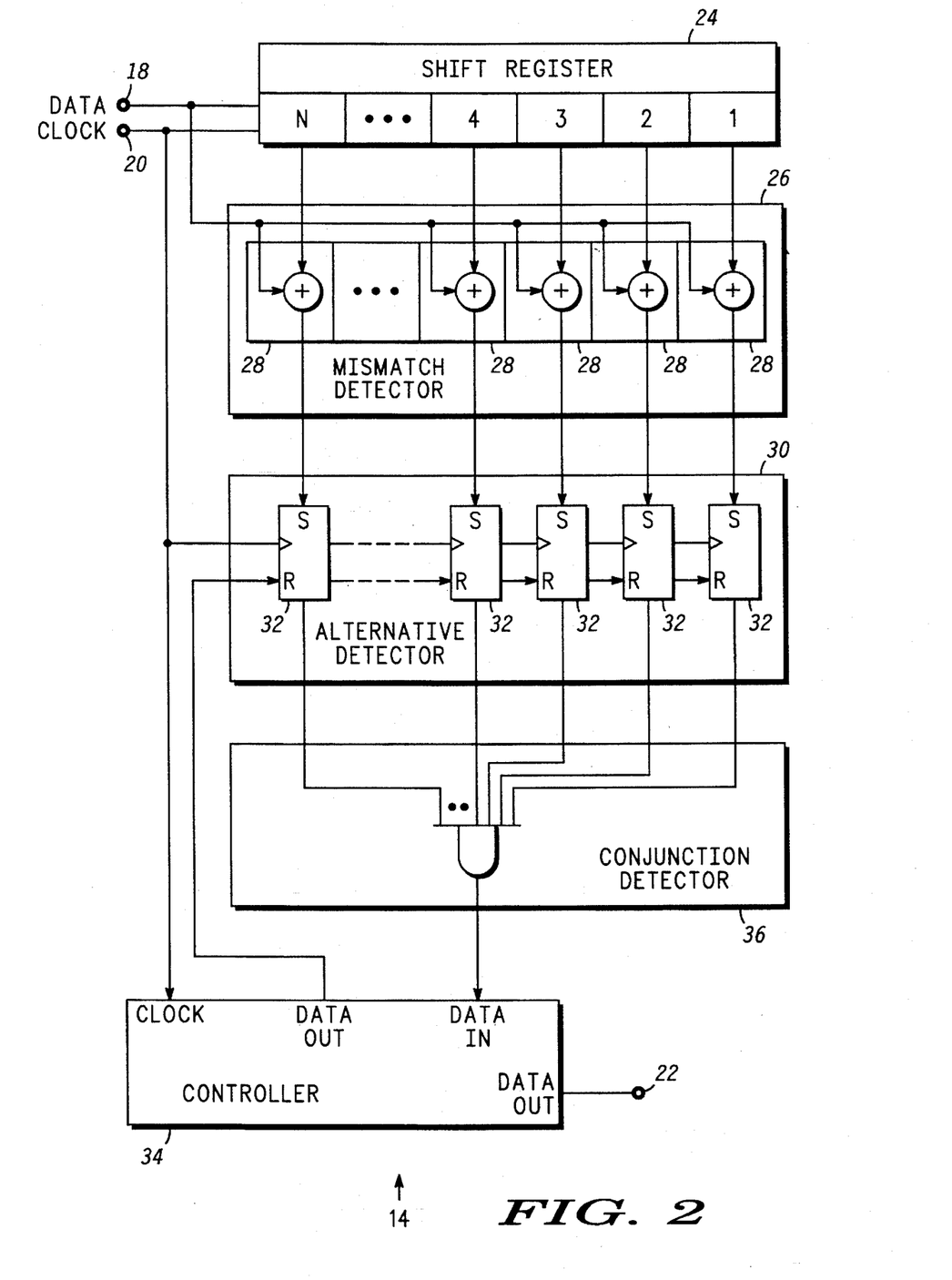
FIG. 2 shows a block diagram of a first embodiment of the arbitrary repeating pattern detector.

FIG. 2 shows a block diagram of a first embodiment of ARPD 14. This embodiment of ARPD 14 operates in real time. Data bus 18, which supplies a sequence of symbols, couples to a serial input of a shift register 24. Clock bus 20 couples to a clock input of shift register 24. Shift register 24 has N stages, where N is the maximum number of symbols that ARPD 14 can detect in a short cycle pattern. In other words, N defines the pattern length for short cycle patterns detectable by ARPD 14. The number N is less than the random number sequence length, and desirably less than or equal to one-half of the sequence length. In most applications, a high number of failure modes for random number generator 12 (see FIG. 1) may be detected when N is very small compared to the total sequence length, and the sequence length is much larger than 2N.

Parallel outputs of shift register 24 couple to corresponding inputs of a mismatch detector 26. Mismatch detector 26 includes N comparison circuits 28. With each symbol being represented by a single binary bit, comparison circuits 28 may, for example, be realized with Exclusive-OR or Exclusive-NOR gates. Each comparison circuit 28 has first and second inputs and an output. The first input of each comparison circuit 28 couples to a corresponding parallel output from shift register 24. The second input of each comparison circuit 28 couples to data bus 18. Thus, mismatch detector 26 compares a single common symbol from data bus 18 with all of the N symbols recorded in shift register 24. The outputs of mismatch detector 26 activate when mismatches are detected.

The N outputs from mismatch detector 26 provides a comparison indication signal set and couple to alternative detector 30. Alternative detector 30 includes N memory elements 32. Clock inputs of the N memory elements 32 couple together, to clock bus 20, and to a clock input of a controller 34. Reset inputs of the N memory elements 32 couple together and to a data output of controller 34. A "set" input of each memory element 32 couples to a corresponding one of the N outputs from mismatch detector 26. Memory elements 32 are "set" under the control of the clock signal when an active comparison indication signal occurs, indicating a mismatch. Generally speaking, alternative detector 30 determines whether any one or more of the comparison indication signals included in each comparison indication signal set indicates a mismatch.

Each of the N memory elements 32 has an output which provides an alternative indication signal and which couples to a conjunction detector 36. While FIG. 2 illustrates conjunction detector 36 as being an AND gate having N inputs and an output, those skilled in the art will appreciate that OR gates, NAND gates, and NOR gates may, for example, also be adapted to serve as conjunction detector 36. Conjunction detector 36 detects the conjunction of the alternative indication signals generated by alternative detector 30. In other words, conjunction detector 36 determines whether all of the alternative indications indicate mismatches or whether at least one of the alternative indications indicates a match. The output from conjunction detector 36 couples to a data input of controller 34. A data output of controller 34 provides output 22 of ARPD 14.

Figure 3:
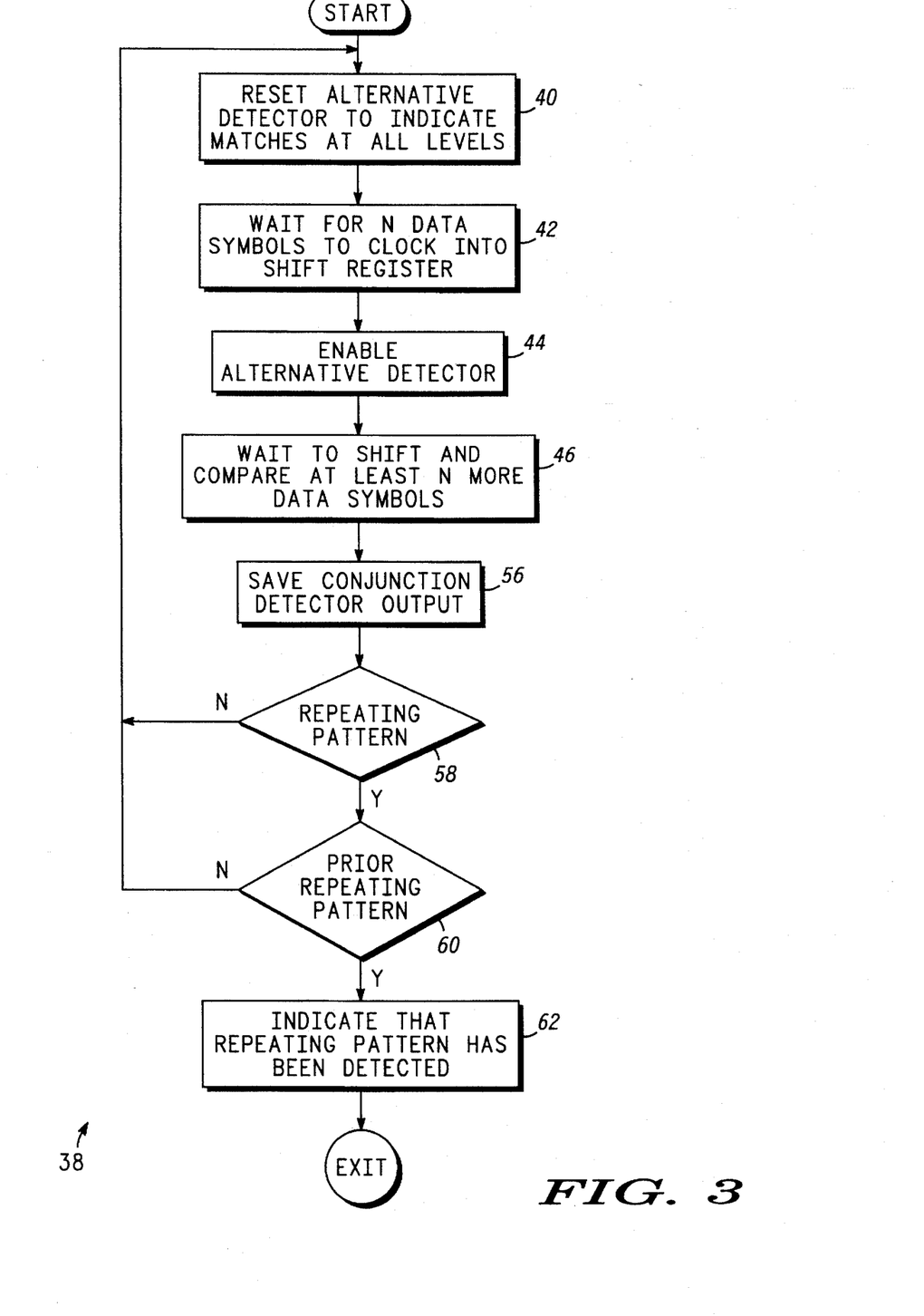
FIG. 3 shows a flow chart of a process performed by a controller in the first embodiment of the arbitrary repeating pattern detector.

In the first embodiment of ARPD 14 illustrated in FIG. 2, controller 34 represents a programmable device, such as a computer, microprocessor, or the like, which operates in accordance with programming instructions stored in a memory (not shown). FIG. 3 shows a flow chart of an exemplary process 38 performed by controller 34 under the control of such programming instructions.

With reference to FIGS. 2 and 3, process 38 starts at any point in the sequence of symbols provided over data bus 18. Process 38 may, but need not, start when the sequence starts. Upon starting, process 38 performs a task 40 to reset alternative detector 30 to indicate matches at all levels therein. In other words, all of memory elements 32 are reset. Controller 34 continues to hold memory elements 32 in their reset state after completion of task 40.

Next, a task 42 waits until N data symbols have been shifted or clocked into shift register 24. Task 42 may determine how long to wait by monitoring the clock signal presented at one of the data inputs of controller 34. After task 42 determines that N data symbols have been loaded into shift register 24, a task 44 enables alternative detector 30 by releasing the reset on memory elements 32. Memory elements 32 may now be set by comparison indications supplied from mismatch detector 26. After task 44, a task 46 causes controller 34 to wait until at least N more data symbols have been clocked.

Figure 4:
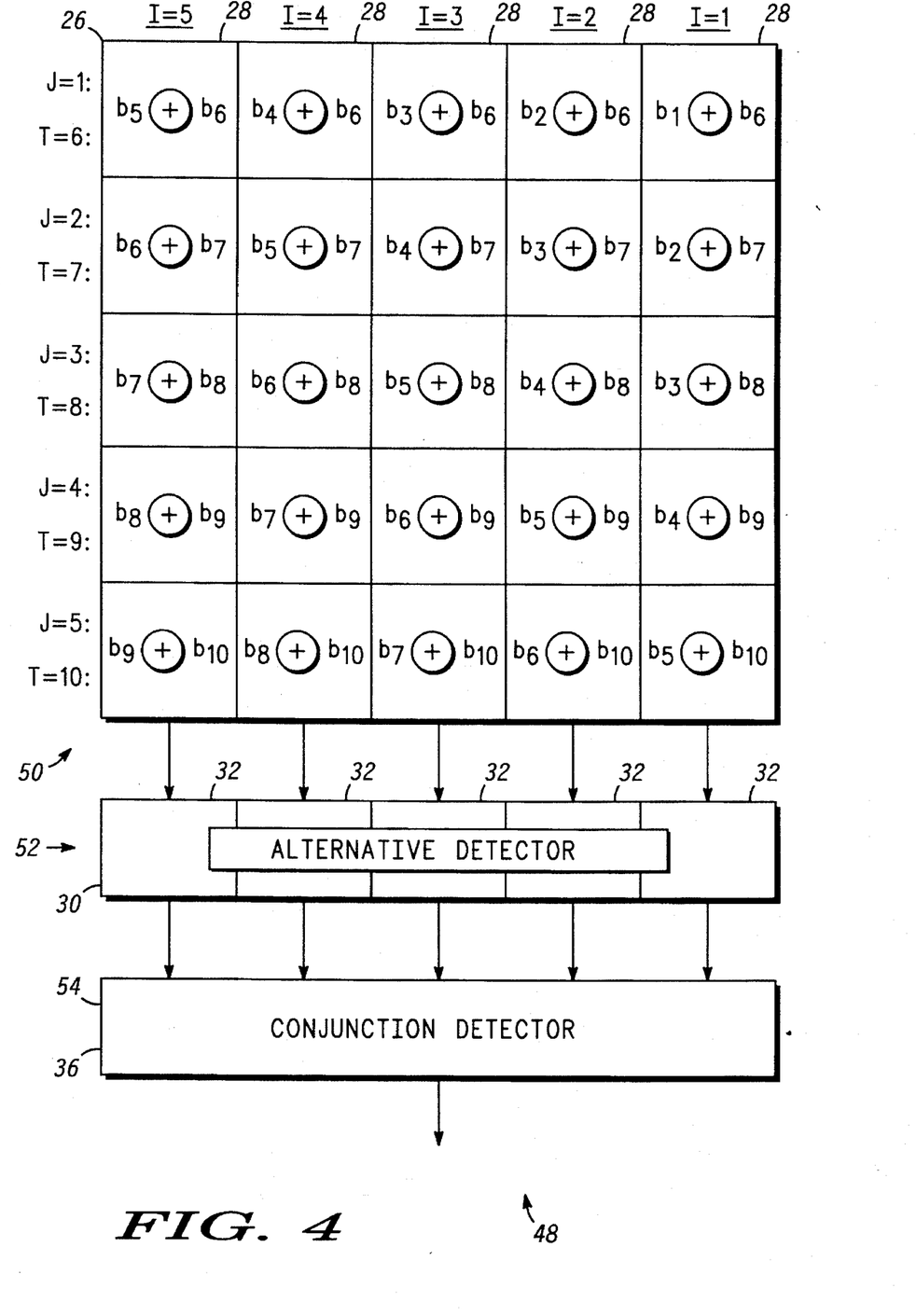
FIG. 4 shows a block diagram which describes the operation of the first embodiment of the arbitrary repeating pattern detector.

FIG. 4. shows a block diagram 48 which describes the operation of the first embodiment of ARPD 14 during task 46 for an example where N equals five. Accordingly, block diagram 48 illustrates the operation of ARPD 14 for five clock pulses which transpire while controller 34 waits at task 46. Five symbols, representable in sequence as symbols $b_1-b_5$ have already been clocked into shift register 24 at this point in this example. Block diagram 48 describes the operation of ARPD 14 during the next five upcoming symbols, which are representable in the sequence as symbols $b_6-b_{10}$.

Block diagram 48 includes a table 50 which describes the operation of mismatch detector 26, a table 52 which describes the operation of alternative detector 30, and a block 54 which describes the operation of conjunction detector 36. Tables 50 and 52 each include five columns, labeled I=1, I=2, I=3, I=4, and I=5. Table 50 is further arranged into five rows, labeled J=1, J=2, J=3, J=4, and J=5.

Each of the variables I and J represent integer numbers in the range of 1–N, inclusive. The I variable corresponds to the various ones of the N levels of ARPD 14. Thus, in table 50 I identifies a particular one of the N comparison circuits 28 (see FIG. 2) in mismatch detector 26 and a corresponding one of the N stages of shift register 24. In table 52 I identifies the particular corresponding one of the N memory elements 32 in alternative detector 30. The J variable corresponds to the various ones of the upcoming N symbols, represented in sequence as $b_6-b_{10}$. Since the five symbols $b_1-b_5$, corresponding to time periods $T_1-T_5$, have already been loaded into shift register 24, values 1-5 for the variable J correspond to time periods $T_6-T_{10}$ and symbols $b_6-b_{10}$, respectively.

The data included in each block of table 50 describe predetermined ones of symbols $b_1-b_{10}$ upon which mismatch detector 26 operates during time periods $T_6-T_{10}$. In particular, mismatch detector 26 makes $N^2$ comparisons (25 in the example depicted in FIG. 4). Each of the N (I=1 through I=5 in the example) comparison circuits 28 produces a set of N (J=1 through J=5) comparison indications for a total of $N^2$ comparisons. At each comparison, mismatch detector 26 compares symbol $b_{I+J-1}$ with symbol $b_{N+J}$ from the sequence of symbols $b_1-b_{2N}$.

At each level in ARPD 14 (I=1 through I=5 in the example) alternative detector 30 determines whether any one of the comparison indications, or blocks in table 50, in an entire set of comparison indications, or column in table 50, indicates a mismatch. If any single one of the comparison indications in a set indicates a mismatch, then the corresponding memory element 32 in alternative detector 30 is set. Once a memory element 32 becomes set, it cannot become reset until controller 34 resets it.

If, for example, a short cycle pattern occurs in which symbols $b_3=b_6$, $b_4=b_7$, $b_5=b_8$, $b_6=b_9$, and so on, then all comparisons in the comparison indication set indicated by column I=3 in table 50 will detect matches, and the memory element 32 corresponding to I=3 will fail to become set. Conjunction detector 36 will detect that less than all of alternative indications indicate a mismatch, and the short cycle pattern will be declared by conjunction detector 36.

Those skilled in the art will appreciate that the present invention is not limited to any particular value for N or to any particular short cycle pattern which may occur. For other patterns, different ones of the comparison indication sets will fail to indicate a mismatch. Within a sequence having at least 2N symbols, ARPD 14 detects all short cycle patterns having a pattern length of N symbols or less.

With reference back to FIGS. 2–3, after an additional N symbols have been received and processed while controller 34 waits at task 46, a task 56 is performed to obtain and save the output from conjunction detector 36. Next, a query task 58 examines this output to determine whether conjunction detector 36 declared a repeating short cycle pattern. If no repeating pattern is indicated, program control may return to task 40, discussed above, to monitor additional symbols on bus 18 (see FIGS. 1–2). On the other hand, if a repeating pattern has been detected, then process 38 may perform additional processing to detect whether the repeating pattern is a false repetition. Those skilled in the art will appreciate that a sequence of random or pseudorandom numbers may legitimately include repeating patterns on occasion. A false repetition represents such a legitimately repeated pattern. If a false repetition has been detected, the repeating pattern should not continue to repeat.

Thus, when task 58 determines that conjunction detector 36 has declared a repeating pattern, a query task 60 determines whether one or more prior repeating patterns have been declared as well. So long as a predetermined number of prior repeating patterns has not been detected, program control may return to task 40 to test for additional repeating patterns. On the other hand, when the predetermined number of repeated patterns has been detected, a task 62 is performed. Task 62 activates a data output of controller 34, causing output 22 from ARPD 14 to activate and indicating that a repeating short cycle pattern has been detected.

Figure 5:
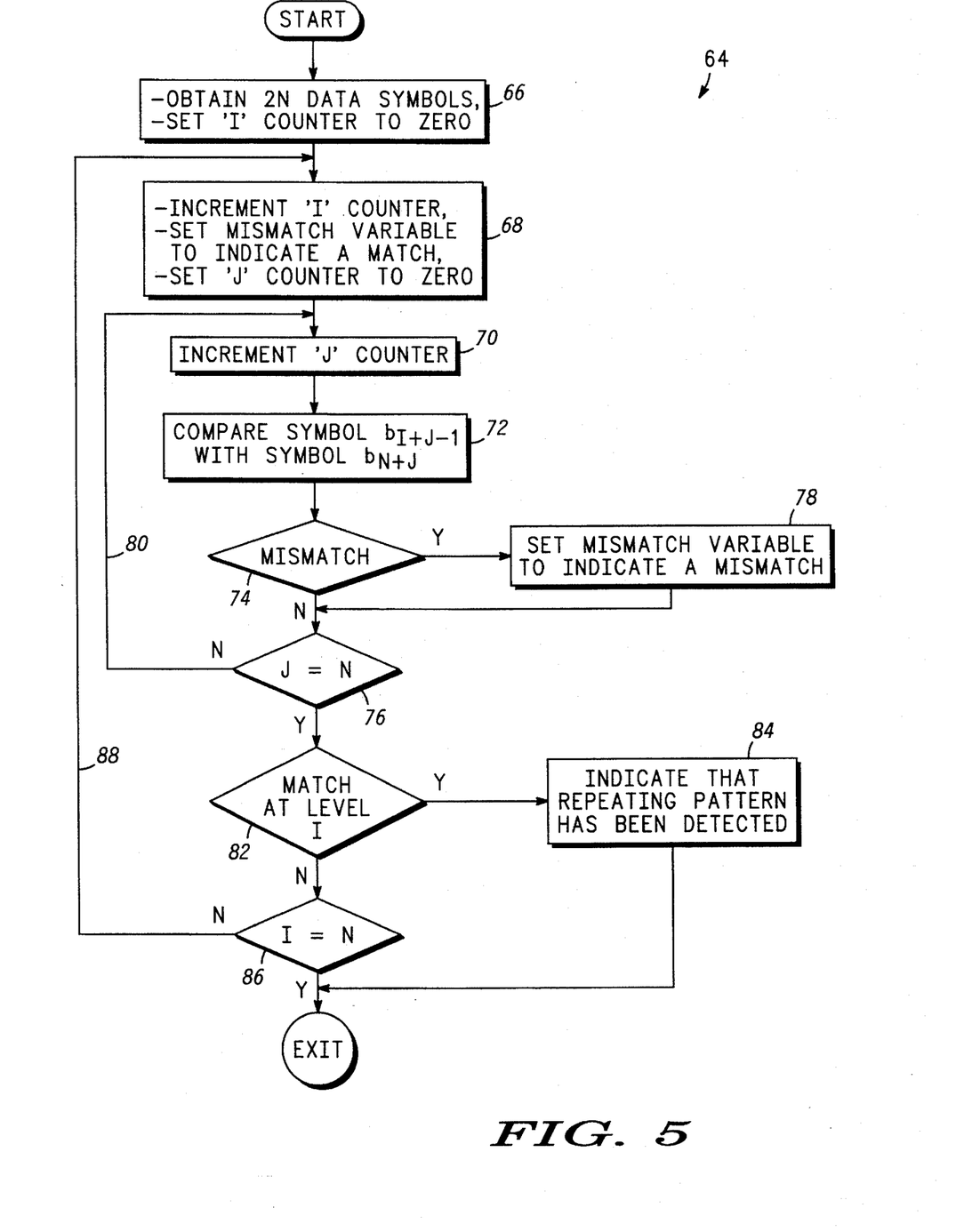
FIG. 5 shows a flow chart of a second embodiment of the arbitrary repeating pattern detector.

ARPD 14 may be implemented differently from the first embodiment described above in connection with FIGS. 2–4. FIG. 5 shows a flow chart of a second embodiment of ARPD 14. This second embodiment is implemented in a conventional computer, microprocessor, or other programmable controller primarily through software programming. Programming instructions stored in a memory (not shown) of the programmable controller define a process 64 which embodies this second embodiment of ARPD 14.

With reference to FIG. 5, process 64 performs a task 66 for initialization. Task 66 obtains 2N data symbols, representable in sequence as symbols $b_1-b_{2N}$, where N is the maximum length of a short cycle pattern detectable by ARPD 14. Task 66 desirably saves symbols $b_1-b_{2N}$ in a memory array. Task 66 additionally initializes an "I" counter to an initial value, such as zero. The I counter serves substantially the same function in this embodiment as the variable I served in the first embodiment (see FIG. 4).

After task 66, a task 68 sets a new value for the I counter, preferably by incrementing the previous value of the counter. In addition, task 68 initializes a "J" counter to an initial value, such as zero, and initializes a mismatch variable to indicate a match. The J counter serves substantially the same function in this embodiment as the variable J served in the first embodiment (see FIG. 4). Next, a task 70 sets a new value for the J counter, preferably by incrementing.

After task 70, a task 72 performs a comparison operation using a predetermined two of the symbols obtained above in task 66. In particular, task 72 compares symbol $b_{I+J-1}$ with symbol $b_{N+J}$. Next, a query task 74 determines whether the comparison indicates a mismatch. If a mismatch is not detected, program control proceeds to a query task 76. If a mismatch is detected, a task 78 sets the mismatch variable to indicate a mismatch. After task 78, program control proceeds to task 76.

Task 76 determines whether the J counter has produced all integer values in the range of 1–N. When the J counter is adjusted by incrementing at task 70, task 76 may examine the J counter to determine if it currently indicates the value of N. If the J counter does not indicate the value of N, program control proceeds back to task 70 to repeat tasks 70, 72, 74, 76, and possibly task 78 in an inner programming loop 80 of process 64. Process 64 repeats inner loop 80 N times.

When task 76 determines that the J counter has produced all values in the range of 1–N, a query task 82 examines the mismatch variable to determine whether it indicates a mismatch or a match. If the mismatch variable indicates a match at task 82, a repeating pattern has been detected, and a task 84 is performed to indicate that fact. After task 84, program control exits process 64. Of course, those skilled in the art will appreciate that additional tasks related to detecting false repetitions or other activities may then be performed as discussed above in connection with FIG. 3.

When task 82 determines that the mismatch variable indicates a mismatch, a query task 86 is performed. Task 86 determines whether the I counter has produced all integer values in the range of 1–N. When the I counter is adjusted by incrementing at task 68, task 86 may examine the I counter to determine if it currently indicates the value N. If the I counter does not indicate the value of N, program control proceeds back to task 68 to repeat task 68, inner loop 80, and tasks 82 and 86 in an outer programming loop 88 of process 64. Process 64 repeats outer loop 88 N times so long as task 82 continues to detect mismatches. When task 86 determines that outer loop 88 has been performed N times, program control exits process 64. No pattern repetition has been detected. Of course, those skilled in the art will appreciate that process 64 may be instantly repeated for another 2N data symbols if desired.

In this second embodiment, task 72 performs the function of mismatch detector 26 (see FIG. 2). Task 72 is performed N times for each iteration of inner loop 80, and inner loop 80 is performed N times for each iteration of outer loop 88. Consequently, task 72 may be performed $N^2$ times to produce $N^2$ comparison indications.

Tasks 74 and 78 together perform the function of alternative detector 30 (see FIG. 2). One set of N comparison indications is generated by task 72 for each iteration of outer loop 88. Each iteration of outer loop 88 causes task 72 to be performed N times. The set of comparison indications are combined through tasks 74 and 76. If any one of the comparison indications in the set indicates a mismatch, then the mismatch variable is programmed to indicate a mismatch and the entire set is declared a mismatch.

Task 82 performs the function of conjunction detector 36 (see FIG. 2). At the point in process 64 where task 82 is performed, the mismatch variable provides an alternative indication. One alternative indication is provided for each iteration of outer loop 88. If any one of the alternative indications declares a match for all comparison indications in the set, then a repeating pattern is declared. So long as no matches are declared, outer loop 88 will be performed N times, and task 82 will examine N alternative indications.

Figure 6:
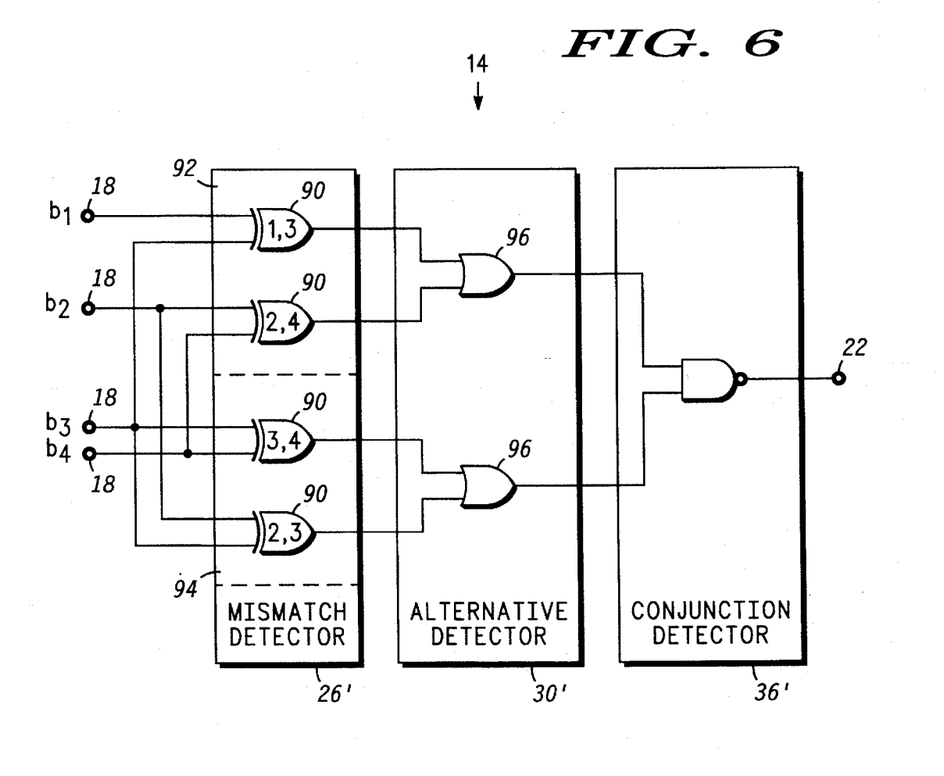
FIG. 6 shows a block diagram of a third embodiment of the arbitrary repeating pattern detector.

The first and second embodiments of ARPD 14 each use various forms of memory and software programming in order to detect a repeated pattern. However, ARPD 14 requires neither memory nor software programming. FIG. 6 shows a block diagram of a third embodiment of ARPD 14. This third embodiment of ARPD 14 does not require memory or software programming. FIG. 6 depicts a specific example of the third embodiment in which N=2. However, those skilled in the art will appreciate that the third embodiment may also be configured for any value of N.

With reference to FIG. 6, four bits of data are supplied in parallel from data bus 18 (see FIG. 1). The four bits correspond to the number 2N, where N is the maximum size of the short cycle pattern detectable by ARPD 14. The four bits are represented in FIG. 6 using the nomenclature $b_1$–$b_4$, where the numbers 1–4 denote sequencing. The four bits may directly couple to a mismatch detector 26'. Mismatch detector 26' consists of $N^2$ (4 in the example) Exclusive-OR gates 90.

Each Exclusive-OR gate 90 receives a predetermined two of bits $b_1$–$b_4$. In particular, a first set 92 includes two of Exclusive-OR gates 90. One gate 90 in set 92 receives bits $b_1$ and $b_3$, and the other gate 90 in set 92 receives bits $b_2$ and $b_4$. A second set 94 also includes two of Exclusive-OR gates 90. One gate 90 in set 94 receives bits $b_3$ and $b_4$, and the other gate 90 in set 94 receives bits $b_2$ and $b_3$. As discussed above in connection with FIGS. 4–5, the $N^2$ comparison indications produced by mismatch detector 26' correspond to comparisons of bits $b_{I+J-1}$ with $b_{N+J}$ for all combinations of I and J, where I and J are integer numbers in the range of 1 to N, inclusive.

The $N^2$ outputs from mismatch detector 26' couple to inputs of an alternative detector 30'.

Alternative detector 30' includes N OR gates 96, one for each set of comparison indications provided by mismatch detector 26'. Each OR gate 96 determines whether any one of the N comparison indications in its set of comparison indications indicates a mismatch. If a single mismatch from a set of comparison indications is indicated, then OR gate 96 for the set produces an active output. The outputs from OR gates 96 of alternative detector 30' couple to inputs of a conjunction detector 36'. Conjunction detector 36' may include a single NAND gate having N inputs. Conjunction detector 36' determines whether all of the alternative indications from alternative detector 30' indicate mismatches (active) or whether at least one of the alternative indications indicates a match (inactive). An output of conjunction detector 36' may couple to output 22 of ARPD 14. This output goes active to indicate detection of a repeating pattern whenever at least one of the alternative indications indicates a match.

In summary, the present invention provides an improved repeating pattern detector. The pattern detector of the present invention detects short cycle patterns having a length less than or equal to N from a sequence of symbols greater than 2N. The detection of short cycle patterns allows the present invention to provide a simple, real time, inexpensive, and practical integrity test on sequences of random or pseudo-random numbers. This integrity test catches numerous different failure modes for a wide variety of random and pseudorandom number generators. The present invention may be implemented in hardware, in software, or in a combination of hardware and software as desired for a particular application.

The present invention has been described above with reference to preferred embodiments. However, those skilled in the art will recognize that changes and modifications may be made in these preferred embodiments without departing from the scope of the present invention. For example, while a programmable controller has been illustrated in connection with the first embodiment of the present invention, those skilled in the art will appreciate that an alternate controller may be implemented using counters. Moreover, those skilled in the art will appreciate that symbols being tested for short cycle patterns need not be obtained from a bus but may be obtained from a memory as a result of executing computer programs. Further, the precise process of the second embodiment of the present invention may be altered considerably by those skilled in the art. For example, those skilled in the art may swap the above-described inner and outer loops. These and other changes and modifications which are obvious to those skilled in the art are intended to be included within the scope of the present invention.

What is claimed is:

1. An arbitrary repeating pattern detector comprising:
   means for receiving a sequence of symbols;
   means for storing said received symbols;
   a mismatch detector coupled to said storage means to provide sets of comparison indications from determining whether a predetermined number of said received symbols match said predetermined number of said stored symbols;
   an alternative detector coupled to said mismatch detector to provide alternative indications from determining whether, for each of said sets of said comparison indications, any one of said comparison indications within said set indicates a mismatch; and
   a conjunction detector, coupled to said alternative detector, to determine whether all of said alternative indications indicate mismatches.

2. A repeating pattern detector as claimed in claim 1 further comprising supplying means for supplying bits of digital data.

3. A repeating pattern detector as claimed in claim 1 wherein:
   said pattern detector detects a sequentially repeating pattern having ≦ N symbols, where N is an integer number less than or equal to one-half the number of symbols in said sequence;
   said mismatch detector provides $N^2$ comparison indications arranged in N sets, wherein each of said N sets includes N comparison indications; and
   said alternative detector provides N alternative indications.

4. A repeating pattern detector as claimed in claim 3 further comprising supplying means for supplying 2N symbols representable in sequence as symbols $b_1$ through $b_{2N}$; and wherein
   said mismatch detector compares each symbol $b_{I+J-1}$ with each symbol bN+J for all values of I and J, where each of I and J is an integer variable representing values in the range of 1 through N.

5. A repeating pattern detector as claimed in claim 4 wherein said mismatch detector includes means for supplying one of said sets of comparison indications for each of said values of I.

6. A repeating pattern detector as claimed in claim 1 wherein said storing means is a shift register having a shift input coupled to said receiving means and a parallel output coupled to said mismatch detector.

7. A repeating pattern detector as claimed in claim 6 wherein:
   said pattern detector detects a sequentially repeating pattern having ≦Nsymbols, where N is an integer number less than or equal to one-half the total number of symbols in said sequence;
   said shift register stores a sequence of N symbols;
   said mismatch detector provides $N^2$ comparison indications arranged in N sets, wherein each of said N sets includes N comparison indications; and
   said alternative detector provides N alternative indications.

8. A repeating pattern detector as claimed in claim 7 wherein:
   said mismatch detector includes N comparison circuits each of which have first and second inputs and an output;
   said N first inputs couple to said shift register to receive N corresponding ones of said symbols stored therein; and
   said N second inputs couple to said supplying means to receive a common symbol not stored in said shift register.

9. A repeating pattern detector as claimed in claim 8 wherein:
   said sequence of N symbols is representable in sequence as symbols $b_1$ through $b_N$; and
   said common symbol is representable in said sequence as symbol $b_{N+1}$.

10. A repeating pattern detector as claimed in claim 8 wherein said alternative detector comprises N memory elements each of which has an input coupled to a corresponding one of said N outputs of said comparison circuits.

11. A repeating pattern detector as claimed in claim 10 additionally comprising means, coupled to said N memory elements, for causing all of said N memory elements to indicate a matching condition.

12. A repeating pattern detector as claimed in claim 1 additionally comprising means, coupled to said conjunction detector, for detecting false repetitions.

13. A method executed by a computer as part of a computer program of detecting an arbitrary repeating pattern comprising the steps of:
   a) receiving and storing a sequence of symbols;
   b) determining whether a predetermined number of said received symbols match said predetermined number of said stored symbols;
   c) providing sets of comparison indications in response to said step (b);
   d) determining, whether, for each of said sets of said comparison indications, any one of said comparison indications within said set indicates a mismatch;
   e) providing alternative indications in response to said step (d); and
   f) determining whether all of said alternative indications indicate mismatches.

14. A method of detecting a repeating pattern as claimed in claim 13 wherein:
   said method detects a sequentially repeating pattern having ≦N symbols, where N is an integer number less than or equal to one-half the number of symbols in said sequence;
   said step (b) makes $N^2$ determinations;
   said step (c) arranges results from said $N^2$ determinations in N sets, wherein each of said N sets includes N comparison indications; and
   said step (e) provides N alternative indications.

15. A method of detecting a repeating pattern as claimed in claim 14 wherein:

said step (a) obtains 2N symbols representable in sequence as symbols $b_1$ through $b_{2N}$; and said step (b) comprises the step of comparing each symbol $b_{I+J-1}$ with each symbol $b_{N+J}$ for all values of I and J, where each of I and J is an integer variable representing values in the range of 1 through N.

16. A repeating pattern detector as claimed in claim 15 wherein said step (c) comprises the step of providing one of said sets of comparison indications for each of said values of I.

17. A method of detecting a repeating pattern as claimed in claim 14 wherein:

said step (a) obtains 2N symbols representable in sequence as symbols $b_1$ through $b_{2N}$;

I and J are each integer variables representing values in the range of 1 through N; and said step (b) comprises the steps of:

g) setting a value for I;

h) setting a value for J;

i) comparing a symbol $b_{I+J-1}$ with a symbol $b_{N+J}$;

j) repeating said steps (h) and (i) for all remaining possible values for J; and k) repeating said steps (g), (h), (i), and (j) for all possible values of I.

18. A method as claimed in claim 17 wherein said step (d) comprises the step of setting a variable for any repetition of said step (i) that indicates a mismatch.

19. A method as claimed in claim 18 wherein said step (f) comprises the step of examining said variable after said step (j) to determine whether said variable indicates a mismatch.

20. A method as claimed in claim 18 additionally comprising the step of initializing, prior to said step (g), said variable to indicate a match.

21. A method of detecting a repeating pattern as claimed in claim 13 additionally comprising the step of repeating said steps (a)–(f) when said step (f) determines that not all of said alternative indications indicate mismatches to test for a false repetition.

* * * * *

UNITED STATES PATENT AND TRADEMARK OFFICE
CERTIFICATE OF CORRECTION

PATENT NO. : 5,528,526
DATED : June 18, 1996
INVENTOR(S) : Keith M. Klug et al.

It is certified that error appears in the above-indentified patent and that said Letters Patent is hereby corrected as shown below:

In column 9, claim 4, line 52, delete "bN+J" and insert --$b_{N+J}$--.

Signed and Sealed this

Second Day of September, 1997

Attest:

BRUCE LEHMAN

Attesting Officer    Commissioner of Patents and Trademarks